United States Patent
Wilk et al.

(10) Patent No.: US 10,175,038 B2
(45) Date of Patent: Jan. 8, 2019

(54) METHOD OF INSPECTING THE THICKNESS OF A PART OF HOLLOW SHAPE

(71) Applicant: SAFRAN AIRCRAFT ENGINES, Paris (FR)

(72) Inventors: Sébastien Wilk, Moissy-cramayel (FR); Sébastien Gouet, Moissy-cramayel (FR); Samyo Leonel Ognongo Ibiaho, Moissy-cramayel (FR); Nicolas Tourneux, Moissy-cramayel (FR)

(73) Assignee: Safran Aircraft Engines, Paris (FR)

( * ) Notice: Subject to any disclaimer, the term of this patent is extended or adjusted under 35 U.S.C. 154(b) by 0 days.

(21) Appl. No.: 15/550,957

(22) PCT Filed: Feb. 9, 2016

(86) PCT No.: PCT/FR2016/050282
§ 371 (c)(1),
(2) Date: Aug. 14, 2017

(87) PCT Pub. No.: WO2016/132043
PCT Pub. Date: Aug. 25, 2016

(65) Prior Publication Data
US 2018/0031365 A1    Feb. 1, 2018

(30) Foreign Application Priority Data
Feb. 16, 2015   (FR) ..................... 15 51255

(51) Int. Cl.
*G01B 11/02* (2006.01)
*G01B 11/245* (2006.01)
(Continued)

(52) U.S. Cl.
CPC ........ *G01B 11/022* (2013.01); *B29C 45/0053* (2013.01); *G01B 11/06* (2013.01);
(Continued)

(58) Field of Classification Search
CPC ........... G01B 5/20; G01B 21/04; G01B 17/06
(Continued)

(56) References Cited

U.S. PATENT DOCUMENTS

| 4,614,630 A | 9/1986 | Pluim, Jr. |
| 4,693,861 A | 9/1987 | Lapeyre |

(Continued)

FOREIGN PATENT DOCUMENTS

| EP | 1908919 A1 | 4/2008 |
| FR | 2961866 A1 | 12/2011 |
| WO | 2009106576 A1 | 9/2009 |

OTHER PUBLICATIONS

International Search Report and English language translation dated Apr. 19, 2016, in International Application No. PCT/FR2016/050282 (4 pages).

*Primary Examiner* — Anand S Rao
(74) *Attorney, Agent, or Firm* — Bookoff McAndrews, PLLC

(57) ABSTRACT

A thickness inspection method inspects the thickness of a part having a hollow shape by using tooling enabling a counter-shape to be molded that matches said hollow shape. The method includes putting the part into place on a support secured to the tooling, locking the part in place, and filling the hollow shape with a molding material in order to form the counter-shape. The method also includes solidifying the molding material, acquiring 3D images of the external surface of the part and of the support, and removing the part from the support in order to leave only the counter-shape on the support. The method also includes acquiring 3D images of the outside surface of the counter-shape and of the support, and superposing and processing the 3D images in order to obtain various dimensions of the part enabling its thickness to be inspected.

10 Claims, 2 Drawing Sheets

(51) Int. Cl.
*B29C 45/00* (2006.01)
*G06T 7/62* (2017.01)
*G01B 11/06* (2006.01)
*G06T 7/00* (2017.01)
*H04N 13/239* (2018.01)
*B29K 21/00* (2006.01)

(52) U.S. Cl.
CPC .......... *G01B 11/245* (2013.01); *G06T 7/0004* (2013.01); *G06T 7/62* (2017.01); *H04N 13/239* (2018.05); *B29K 2021/00* (2013.01); *G06T 2207/10012* (2013.01); *G06T 2207/30164* (2013.01)

(58) Field of Classification Search
USPC .................................................. 348/142–160
See application file for complete search history.

(56) References Cited

U.S. PATENT DOCUMENTS

| 5,457,325 | A | 10/1995 | Huberty | |
|---|---|---|---|---|
| 2018/0209774 | A1* | 7/2018 | Ng | G01B 17/00 |
| 2018/0224353 | A1* | 8/2018 | Gysling | G01M 15/14 |

\* cited by examiner

METHOD OF INSPECTING THE THICKNESS OF A PART OF HOLLOW SHAPE

CROSS-REFERENCE TO RELATED APPLICATIONS

This application is the U.S. national phase entry under 35 U.S.C. § 371 of International Application No. PCT/FR2016/050282, filed on Feb. 9, 2016, which claims priority to French Patent Application No. 1551255, filed on Feb. 16, 2015, the entireties of which are herein incorporated by reference.

FIELD OF THE INVENTION

The field of the invention is that of turbine engines, and in particular that of turbine engine fan blades made out of composite material and having a leading edge that includes structural reinforcement made of metal, and the present invention thus relates more particularly to a method of inspecting both the external and the internal dimensions of such structural reinforcement for a turbine engine blade.

Nevertheless, the invention is also applicable to making reinforcement for reinforcing a leading edge or a trailing edge of a blade of any type of turbine engine whether for terrestrial or aviation use, and in particular a helicopter turboshaft engine or an airplane turbojet.

BACKGROUND

It is known to fit turbine engine fan blades that are made out of composite material with metal structural reinforcement that extends over the full height of the blade and beyond its leading edge, as described in Document EP 1 908 919, filed in the name of the Applicant. Such reinforcement makes it possible to protect composite blades in the event of the fan impacting against a foreign body, e.g. such as a bird, hail, or indeed grit.

In particular, the metal reinforcement protects the leading edge of a composite blade by avoiding risks of delamination, of fiber rupture, or indeed of damage by loss of cohesion between the fibers and the matrix. In known manner, the reinforcement is made either by being milled out of a block of titanium, which requires numerous finishing operations and complex tooling involving high fabricating costs, or else starting from a preform obtained from a simple metal bar and by performing a succession of forging steps, as described in particular in patent application FR 2 961 866 filed in the name of the Applicant. Nevertheless, the last forging steps are particularly difficult given the presence of undercuts, and as a result there are sometimes uncertainties as to the final dimensions of the reinforcement, so it is appropriate to be able to perform accurate inspection.

Unfortunately, conventional measurement solutions of the three-dimensional measuring machine (TMM) type or of other types making use of contacts for measuring interior and exterior surfaces of the reinforcement are excluded because of the great geometrical variability of the reinforcement (which makes it difficult to automate a measurement path), and in particular because of the small thickness at certain locations of the reinforcement (which involves a major risk of deforming the part under the sensing force) and because of the inaccessibility of the bottom of the concave reinforcing part, which makes it necessary to use feelers that are long (which involves a major risk of the feeler bending).

SUMMARY

A main object of the present invention is thus to mitigate such drawbacks by proposing a method of measurement that makes it possible to acquire the interior surface of the reinforcement (and more generally of any part having a hollow shape) and that enables this acquisition to be positioned relative to an acquisition of the exterior surface in order to obtain accurately both the external dimensions and the internal dimensions of the reinforcement, and in particular its thickness.

For this purpose, there is provided a thickness inspection method for inspecting the thickness of a part having a hollow shape by using tooling enabling a counter-shape to be molded that matches said hollow shape, the method comprising the following steps:
   putting said part into place on a support secured to said tooling, and locking it in place;
   filling said hollow shape with a molding material in order to form said counter-shape;
   solidifying said molding material;
   acquiring 3D images of the external surface of said part and of said support;
   removing said part from said support in order to leave only said counter-shape on said support;
   acquiring 3D images of the outside surface of said counter-shape and of said support; and
   superposing and processing said 3D images in order to obtain various dimensions of said part enabling its thickness to be inspected.

Thus, combining 3D scanner means with a support makes it possible to hold the part, to mold its interior shape, and to hold the molding once the part has been removed, thereby enabling all of the measurement operations to be performed and in particular enabling the interior dimensions of the part to be acquired without changing the measurement reference frame associated with the support, thus guaranteeing a common reference frame between the measurement of the interior and the measurement of the exterior, an unavoidable condition for performing thickness measurements with the desired accuracy.

Preferably, said part is locked on said support by means of screws passing both through tabs of said part and through uprights of said support, said hollow shape being filled by gravity once the assembly comprising the part and the support and the tooling has been turned upside-down, or else from a distributor pump for distributing said molding material via injection channels opening out into filler holes formed through said support, the 3D images are acquired by means of a stereo vision image acquisition device (having charge coupled device (CCD) or complementary metal oxide on silicon (CMOS) sensors) comprising at least two stationary cameras and a projector, said part is removed from said support without deformation by means of stiffener elements on which said part is placed "astride" but without contacting said stiffener elements, and the 3D images are superposed and processed in an image processor and dimension calculator module connected to said stereo vision image acquisition device.

Said part having a hollow shape is advantageously metal structural reinforcement for a composite fan blade.

Preferably, said molding material is an elastomer type polymer material that, once solidified, presents hardness of substantially 30 on the Shore A scale.

BRIEF DESCRIPTION OF THE DRAWINGS

Other characteristics and advantages of the present invention appear from the following description given with reference to the accompanying drawings, which show an implementation having no limiting character, and in which.

DETAILED DESCRIPTION

Figure 1:
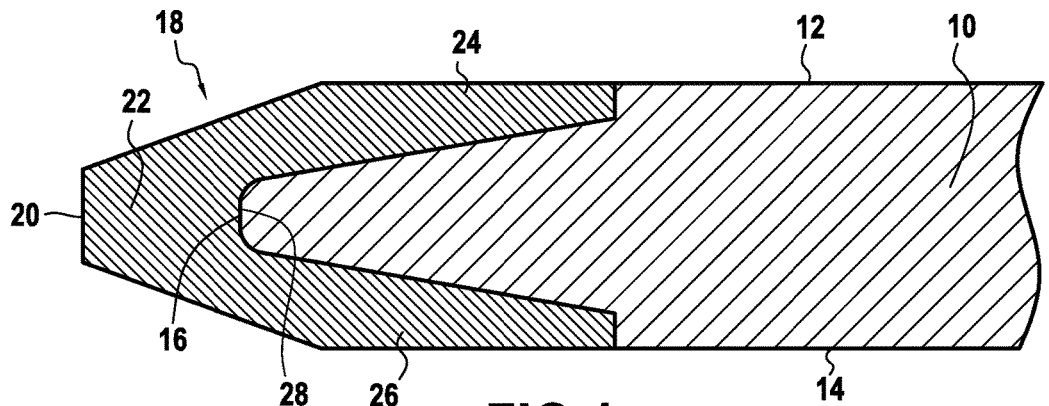
FIG. 1 is a section view of the leading edge of a composite material fan blade showing its metal structural reinforcement.

FIG. 1 is a fragmentary section view of a composite blade including metal structural reinforcement for its leading edge. It is desired to inspect the dimensions of the reinforcement both during and also at the end of its fabrication.

By way of example, the blade 10 shown is a fan blade of a turbine engine (not shown) and it extends between a leading edge and a trailing edge starting from a root of the blade and extending to a tip of the same blade, typically being obtained by draping (filling, adhesive bonding) a woven composite material. By way of example, the composite material used may be an assembly of woven carbon fibers and a resin matrix, the assembly being formed by molding using a conventional vacuum resin injection method of the resin transfer molding (RTM) type.

A pressure side surface 12 and a suction side surface 14 form the side faces of the blade 10 and connect together the leading edge 16 and the trailing edge (not shown) of the blade 10. In known manner, the blade 10 includes metal structural reinforcement 18, preferably based on titanium (because of its great capacity for absorbing energy due to impacts), which reinforcement matches the shape of the leading edge 16 and is adhesively bonded thereto so as to extend it and form the external leading edge, referred to as the leading edge 20 of the reinforcement. The metal structural reinforcement is bonded onto the blade 10 by means of an adhesive known to the person skilled in the art, such as a cyano-acrylic adhesive or indeed an epoxy adhesive.

In conventional manner, the metal structural reinforcement 18 is a single piece having a section that is substantially V-shaped, presenting a web 22 forming the leading edge 20 of the reinforcement and extended by two lateral flanges 24 and 26 fitting closely over the pressure side 12 and the suction side 14 of the blade 10. The flanges 24 and 26 present a profile that is tapered, getting thinner towards the trailing edge of the blade, and their internal surfaces present a roughness factor that guarantees good mechanical quality for the adhesive bond. The web 22 includes an internal profile 28 that is rounded so as to match the rounded shape of the leading edge 16 of the blade 10.

In order to facilitate manipulation of the reinforcement while it is being forged, the reinforcement also includes two tabs 18A and 18B (shown in FIGS. 3 to 7) that come from the initial metal bar and that are preferably square in section. It may be observed that these tabs, which are cut off to end up with the final shape of the reinforcement as mounted and shown in FIG. 1, are used as bearing points during the thickness inspection method of the invention.

The thickness of the reinforcement is inspected by means of tooling suitable for supporting the reinforcement and enabling a part (referred to below as the "counter-shape") to be made by molding that matches the internal shape of the reinforcement (i.e. its hollow portion) so as to make it possible to perform 3D scanning of the internal and external surfaces of the reinforcement, which 3D scanning technology nevertheless requires a common geometrical reference frame in three dimensions in order to enable the various scanned objects to be associated with one another.

Figure 2:
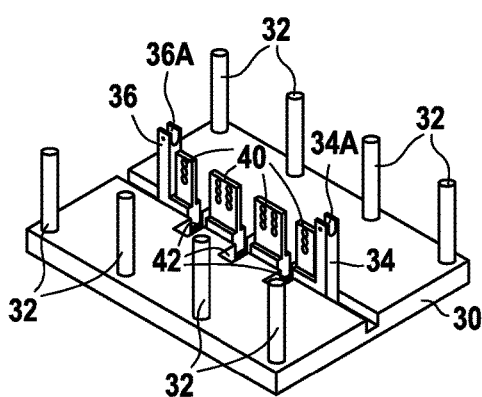
FIG. 2 shows tooling used for performing the thickness inspection method of the invention.

As shown in FIG. 2, the tooling is constituted by a support plate 30 having columns 32 fastened around its periphery, which columns 32 are preferably of equal height and advantageously of hexagonal section so as to be able to have faces enabling reference targets to be stuck flat thereagainst (which targets are necessary for prior characterizing the mounting by photogrammetry). These columns, which perform the geometrical reference frame function in three dimensions, are at least six in number (three per side) so that a large number of the targets are visible in the pictures taken from different viewing angles, and advantageously there are eight of them. Specifically, the reference targets are bonded on the columns and it is necessary to be able to see at least three of them in each picture in order to enable the pictures to be subsequently associated with one another in a 3D image, the "size" of the pictures determining the size of the space between the columns.

Two uprights 34 and 36 that are to serve as bearing points for the reinforcement are fastened to the central portion of the tooling, and each of them has tapping 34A, 36A at its top for receiving the tabs 18A, 18B of the reinforcement. These uprights that are tapped at their tops enables screws 38 passing through them to hold the reinforcement therein and to guarantee that it remains fastened throughout measurements. Between these two bearing points, there are provided stiffener elements 40 that serve to ensure that the counter-shape does not deform during removal of the reinforcement that is placed with its concave portion "astride" the stiffener elements, but without contact between these elements and the reinforcement (see FIG. 4). Filler holes 42 are arranged between the stiffener elements so as to enable a molding material to be injected into the hollow portion of the reinforcement so as to copy its internal 3D shape on solidifying (naturally, the ends of the reinforcement are previously "plugged" with flexible paste or with a flexible and deformable portion, for example, that is secured to the assembly beforehand in order to match the shapes of the ends of the reinforcement while it is being fastened). The molding material is advantageously a polymer material of the elastomer type that is sufficiently flexible to enable it to be unmolded while also being sufficiently rigid to copy the internal shape accurately.

FIGS. 3 to 7 show the various steps of the method of measuring the thickness of the metal structural reinforcement 18 by means of the tooling of FIG. 2.

Figure 3:
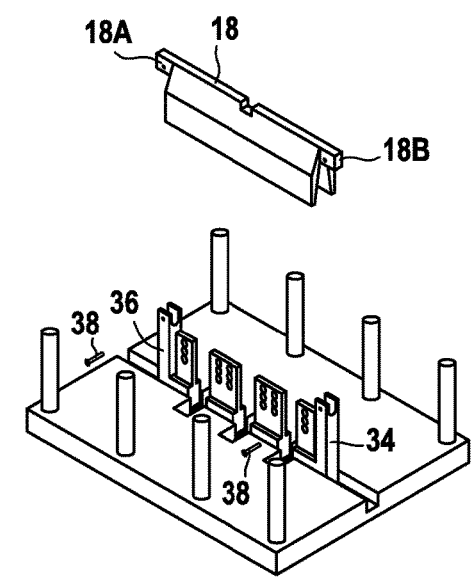
FIGS. 3 to 7 show successive steps of the method of the invention for inspecting thickness by using the tooling of FIG. 2.
Figure 4:
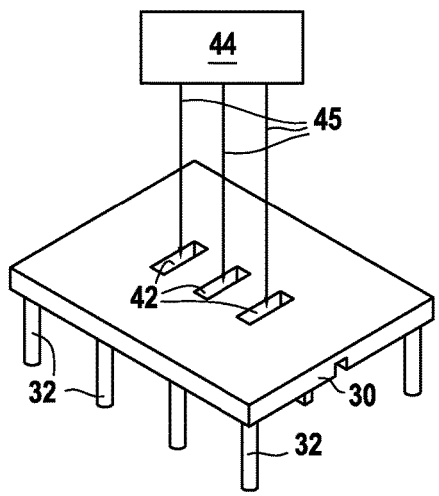
Figure 5:
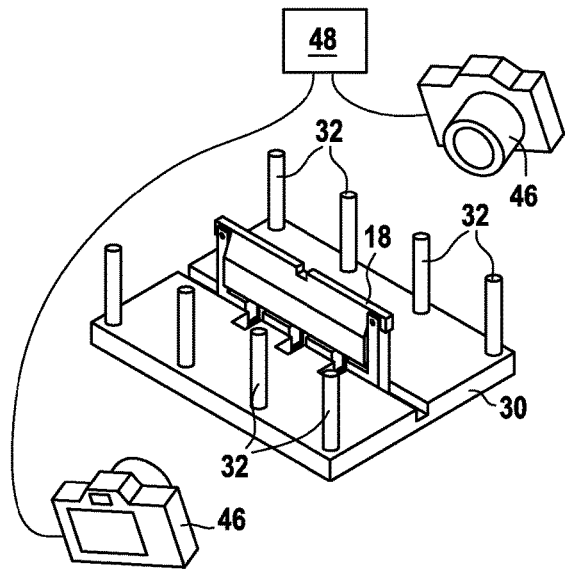
Figure 6:
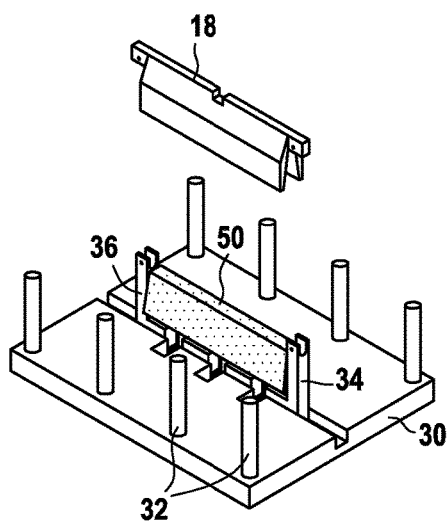
Figure 7:
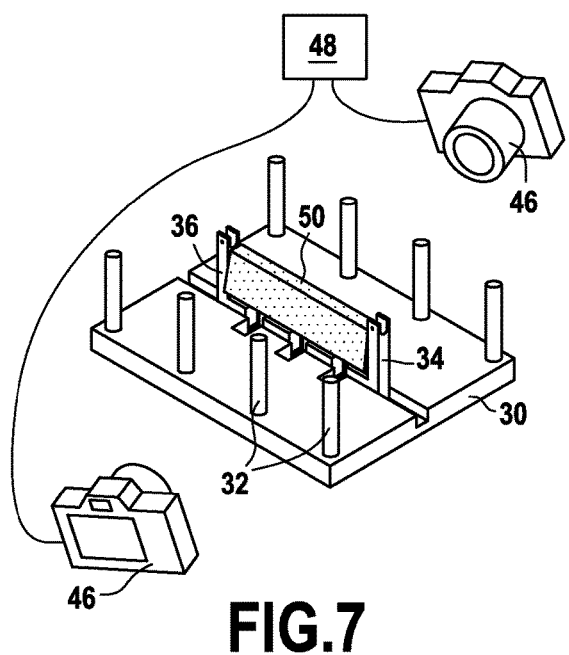

The first step, shown in FIG. 3, consists in positioning the reinforcement on the uprights 34 and 36 forming a support, and in using the screws 38 that pass through both the reinforcement 18 (and more precisely its two tabs 18A and 18B) and the two uprights in order to lock it in place. Once the reinforcement is in place and after the assembly comprising the part, the support, and the tooling is turned upside-down so that it stands on the columns 32, and a second step is performed as shown in FIG. 4 consisting in filling the hollow portion of the reinforcement merely by gravity with an injected polymer material (even though injection under pressure using a delivery pump 44 might also be possible providing adequate sealing means are used) via injection channels 45 opening out into the filler holes 42. The following step, shown in FIG. 5, consists in acquiring images (by 3D scanning) of the outside surface of the reinforcement and of its support. This 3D scanning is performed by a stereo vision image acquisition device 46, e.g. comprising at least two stationary cameras having CCD or CMOS sensors for example (the objects being scanned naturally being illuminated appropriately by a light strip or any other similar lighting element) and connected to an image processor and dimension calculator module 48. Once the scanning has been finished, a new step, shown in FIG. 6, is performed, consisting in removing the reinforcement from its support, while leaving the solidified polymer 50 on its own secured to the support. This step may be facilitated by depositing an unmolding agent on the interior surface of the reinforcement prior to injection. Finally, a terminal step, shown in FIG. 7, consists once more in acquiring 3D images, this time of the solidified polymer material 50 (which carries the interior shape of the reinforcement 18) and also scanning the support.

Since the position of each measurement relative to the support, and more precisely relative to the columns 32 used as common geometrical references is known, it is then possible to superpose accurately in three-dimensional space the external measurement of the reinforcement obtained by the first 3D scan and the interior measurement obtained by the second 3D scan in order to calculate the various dimensions (length, width, and above all thickness of the determined portions) of said part and thus inspect the dimensions and the thickness of the entire part in a manner that is entirely accurate. Specifically, for a measurement of a counter-shape, the three-dimensional reference frame between the measurements of the interior and of the exterior must necessarily be common.

Particular care should be given to selecting the material used for filling (internal molding of the reinforcement) since its properties must make it possible to guarantee the accuracy of the reproduced shape. In particular, as mentioned above, it must be sufficiently rigid to ensure this accuracy, while nevertheless being sufficiently flexible to enable the reinforcement to be removed without having recourse to complex unmolding means. Another constraint is that the solidification of the material must not lead to its dimensions changing (drying, cooling, . . . ).

That is why it is preferable to have recourse to a polymer material, since polymerization is a reaction that takes place cold, without drying, and without any change of volume. Furthermore, it is possible to combine its properties before and after casting almost at will (such as castability, hardness, color, appearance, stiffness, brightness). In the context of inspecting thickness in accordance with the invention of metal structural reinforcement for composite fan blades, the inventors have thus been able to observe that a polymer of the elastomer type having hardness substantially equal to 30 on the Shore A scale, once solidified, is entirely suitable.

We claim:

1. A thickness inspection method for inspecting the thickness of a part having a hollow shape by using tooling enabling a counter-shape to be molded that matches said hollow shape, the method comprising the following steps:

putting said part into place on a support secured to said tooling, and locking it in place;

filling said hollow shape with a molding material in order to form said counter-shape;

solidifying said molding material;

acquiring 3D images of the external surface of said part and of said support;

removing said part from said support in order to leave only said counter-shape on said support;

acquiring 3D images of the outside surface of said counter-shape and of said support; and superposing and processing said 3D images in order to obtain various dimensions of said part enabling its thickness to be inspected.

2. The thickness inspection method according to claim 1, wherein said part is locked on said support by means of screws passing both through tabs of said part and through uprights of said support.

3. The thickness inspection method according to claim 1, wherein said hollow shape is filled by gravity once the assembly of the part and the support and the tooling has been turned upside-down via injection channels that lead to filler holes formed through said support.

4. The thickness inspection method according to claim 1, wherein said hollow support is filled from a distributor pump for distributing said molding material via injection channels opening out into filler holes passing through said support.

5. The thickness inspection method according to claim 1, wherein the 3D image acquisition is performed by a stereo vision image acquisition device comprising at least two stationary cameras.

6. The thickness inspection method according to claim 5, wherein the 3D images are superposed and processed in an image processor and dimension calculator module connected to said stereo vision image acquisition device.

7. The thickness inspection method according to claim 5, wherein said stereo vision image acquisition device includes at least one CCD or CMOS sensor.

8. The thickness inspection method according to claim 1, wherein said part is removed from said support without deformation by means of stiffener elements on which said part is placed astride but without contacting said stiffener elements.

9. The thickness inspection method according to claim 1, wherein said part having a hollow shape comprises metal structural reinforcement for a composite fan blade, the reinforcement having two side fins extending from a web.

10. The thickness inspection method according to claim 1, wherein said molding material is an elastomer type polymer material that, once solidified, presents a hardness of substantially 30 on the Shore A scale.

\* \* \* \* \*